Patented June 11, 1935

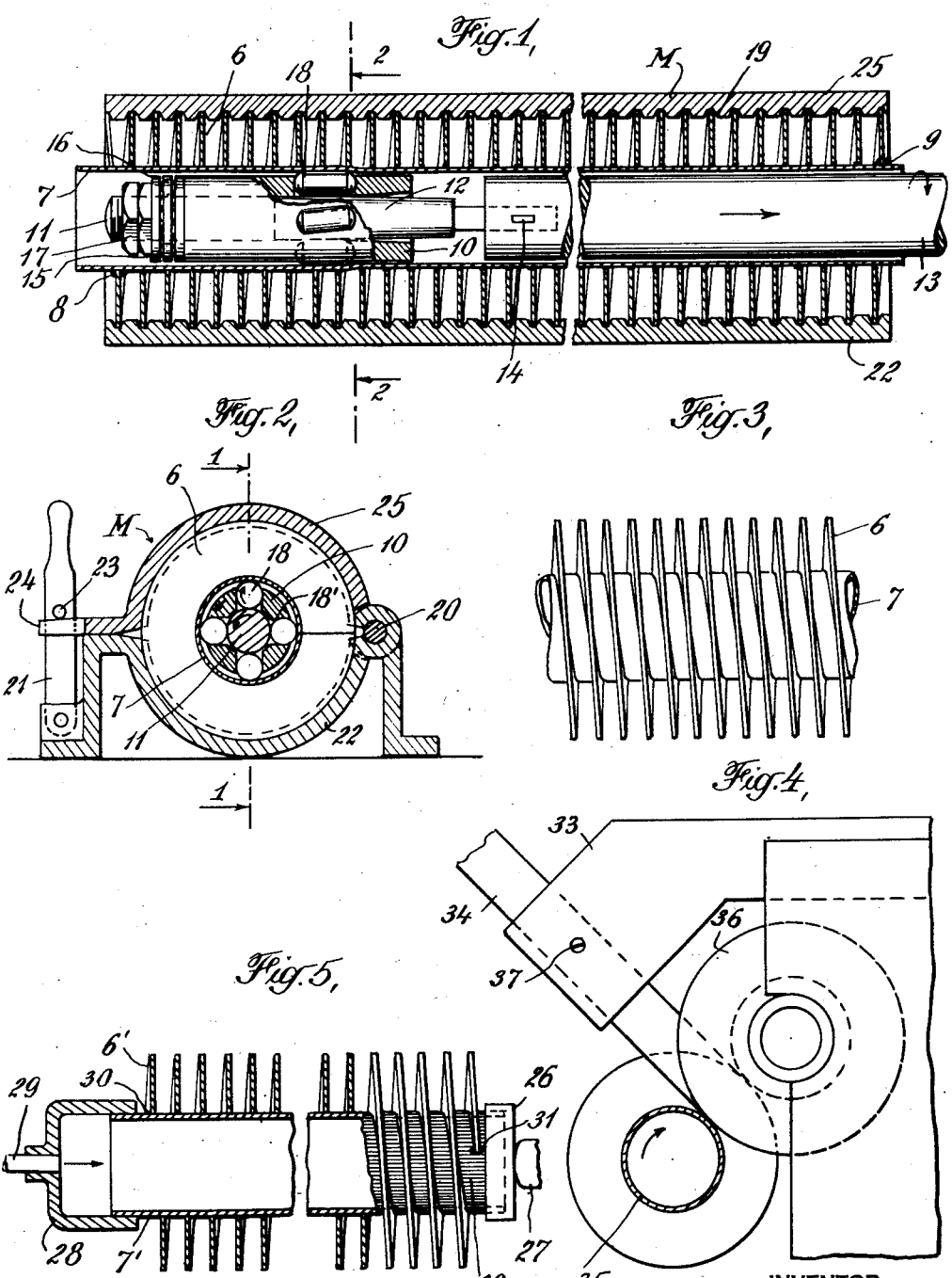

2,004,389

UNITED STATES PATENT OFFICE 2,004,389

MANUFACTURE OF FINNED TUBING

Russell C. Jones, Bronxville, N. Y., assignor to The Griscom-Russell Company, New York, N. Y., a corporation of Delaware Application May 22, 1933, Serial No. 672,146

8 Claims. (Cl. 29—157.3)

This invention relates to fin tubing and more particularly concerns an improved method of securing a helical fin to the external surface of the tube.

Fin tubing of the type concerned herein comprises a metallic tube carrying on its external surface, a thin ribbon-like metallic fin in the form of a helix with the inner edge of the helical fin engaging the tube.

In the past, fin tubing of the character described has been made in either one of two different ways. Thus the thin ribbon or strip of metallic fin material has been wound helically on a tube and then secured thereto by a molten metal bond of solder or like material. Another previously known method involves cutting a helical groove on the outer surface of the tube, inserting the inner edge of a helical fin in such groove and pressing the edges of the groove into clamping relation with the fin edge. These known methods of securing helical fins on tubes have certain disadvantages. Thus the soldered constructions are relatively expensive since they entail the loss of considerable soldering material which adheres to the portions of the tube and fin where it is not needed. Furthermore, expansion and contraction of the tube oftentimes loosens the soldered joint. The grooving method of fin attachment, although satisfactory for certain types of work, cannot be used with success when the tube walls are thin because the grooving considerably weakens the tube.

In the manufacture of another form of fin tubing comprising a plurality of separate perforated fins or plates spaced along the tube surface with the tube passing through the perforations thereof, it has heretofore been customary to secure a bond between the tube and the fin by expanding the tube against the continuous surfaces of the openings in the individual fins or plates. This attachment method overcomes the major drawbacks of the above mentioned grooving or soldering methods of securing helical fins to tubes, but prior to my present invention, this tube expanding method has been considered impossible of application where helical fins are employed, and this for the principal reason that with a helical fin there is no closed continuous fin edge or surface through which the tube may be passed and against which it may be expanded.

With the above considerations in mind, it is the object of the present invention to provide an improved method for permanently securing a helical fin on a surface of a tube. I have discovered that, contrary to previously accepted theories, a secure and permanent bond may be formed between a helical fin and a tube by expanding the tube against the fin.

In general, my improved method comprises first positioning a helical fin on the surface of the tube, suitably securing the fin against movement circumferentially about the tube at points spaced longitudinally along the tube, and expanding the tube between such points of securement. The expansion of the tube may be progressive, as is effected by the use of a suitable expanding tool moving axially through the bore of the tube, or the tube may be expanded throughout the length thereof by the use of hydraulic fluid pressure or other suitable means. The fin may be formed into a helical edgewise coil before being placed on the tube surface, or the fin may be wound to helical form directly on the tube to which it is secured by the expanding operation. The helical fin edge surface and the tube surface to which it is attached may both be smooth, but in accordance with a modified form of the invention, either or both of these surfaces may be roughened, knurled or otherwise formed or treated to produce surface protrusions or irregularities thereon which cause penetrating engagement between the fin and the tube and so effectively secure the fin against dislodgement.

The invention will be best understood by reference to the accompanying drawing, in which certain embodiments thereof have been illustrated. In the drawing;

Figure 1 is a sectional elevation, taken along the line 1—1 of Figure 2, showing one embodiment of my improved helical fin attaching method;

Figure 2 is a sectional view, taken along the line 2—2 of Figure 1 and viewed in the direction of the arrows;

Figure 3 is an elevation of a helical finned tube constructed in accordance with my improved method;

Figure 4 is a diagrammatic and simplified illustration of means for winding the fin helically on the tube to which it is subsequently attached; and Figure 5 is an elevation, partly in section, showing another embodiment of my helical fin attaching method.

Referring to the drawing, and more particularly to Figs. 1, 2 and 3, in accordance with one embodiment of my invention, the helical fin 6 is attached to the surface of the tube 7 by progressively expanding the tube against the fin. The fin 6 is made from a flat metallic strip or ribbon and may be previously bent into a flat or edgewise helical coil in any suitable manner, as for example, by the machine and method disclosed in the Patent No. 1,878,233, of Edward A. Dewald, issued September 20, 1932.

The precoiled fin 6 is positioned on the tube 7 as shown and is suitably fixed against circumferential movement relative to the tube surface. This fixing of the fin against circumferential movement may be accomplished by securing spaced points on the fin to the tube surface, as by soldering or welding, as shown at 8 and 9 in Fig. 1, or it may be accomplished by connecting successive or spaced coils or turns of the fin together to prevent relative movement therebetween. When successive or spaced coils or turns of the fin are connected together, the fin forms in effect one or more closed loops encircling the tube, and movement of the fin circumferentially of the tube due to expansion of the tube is prevented. It should be understood that the step of fixing the fin against circumferential movement about the tube due to expansion of the tube, as set forth in the appended claims, includes either fixing the fin to the tube at spaced points or connecting successive or spaced coils or turns of the fin together, or a combination of both of these fixing means. The interconnecting of successive or spaced coils or turns of the fin may be accomplished by any sutiable clamping or gripping means such as the magazine M shown in Fig. 1 and described below.

In the embodiment of Fig. 1, the tube 7 is progressively expanded by moving a suitable expanding tool therethrough. Any known expanding tool and means for propelling the same may be used. As shown, the tool comprises a cylindrical casing 10 surrounding and carried by a mandrel 11 having a conical portion 12. The mandrel 11 is secured to the end of a drive shaft 13 by a connection 14. A thrust bearing 15, which may include anti-friction means such as a ball race, is disposed between the outer end of the casing 10 and a washer 16. Lock nuts 17 or equivalent adjustable stop means are fixed to the outer end of the mandrel 11 in engagement with the washer 16. A plurality of expanding rollers 18 are carried in circumferentially spaced relation by the casing 10. In the disclosed embodiment, four equally spaced rollers 18 are used, each being rotatably carried in an opening 19 in the casing 10 and retained therein by the inturned outer edges of the opening, as shown in Fig. 2. The rollers are set diagonally to have a lead, that is, each roller is disposed at an angle to an element of the cylindrical casing 10 whereby the expanding tool is advanced through the tube by the spiral path of travel of the rollers along the interior of the tube as the tool is rotated. Rotary motion is transmitted from the mandrel 11 to the casing 10 by the rollers 18 which rotate as planetary pinions between the mandrel and the inner surface of the tube. It will be clear that the degree of expansion effected may be variably adjusted by moving the lock nuts 17 along the mandrel 11 and so changing the point on the tapered portion 12 at which the rollers 18 come into contact with the mandrel.

In operation, the shaft 13 is passed through the tube 7, the expanding tool is attached to the end of the shaft and the shaft is simultaneously rotated and moved axially relative to the tube in the direction indicated by the arrows. As the tool passes through the bore of the tube, the rollers 18 progressively distend the tube into tight gripping engagement with the inner edge of the continuous helical fin 6, thereby permanently securing the fin to the tube surface. Movement of the fin circumferentially of the tube at the point of expansion, if any such movement occurs, serves to tighten the fin on the tube between the fixed points 8 and 9.

In some cases, it is desirable to fix the successive coils of the helical fin 6 against movement longitudinally along the tube surface during the expanding operation, and thereby to prevent crowding or movement of the coils toward one end of the tube as the expanding tool moves therethrough. As shown in Figs. 1 and 2, the fin coils may be fixed against longitudinal movement by a suitable magazine M which embraces the coiled fin and retains the continuous outer edge thereof in a continuous helical groove 19 formed in the inner surface of the magazine. As shown in Fig. 2, the magazine M is preferably split longitudinally and the two halves hinged together at 20. The two parts of the magazine may be releasably secured together about the helical fin 6 by means of any suitable locking device, such as the lever 21, hinged to an extension of the lower half 22 of the magazine and having a cross member 23 engaging the upper surface of a slotted extension 24 on the upper half 25 of the magazine. The engagement between the magazine M and the fin 6 may be sufficiently secure to effectively connect the adjacent turns or coils of the fin together and thereby fix the fin against movement circumferentially of the tube due to expansion of the tube.

As stated above, the tube may be secured to the helical fin by expanding the tube throughout its length rather than by expanding it progressively. As shown in Fig. 5, one end of the tube 7' may be sealed by a fluid-tight cap 26, held in place by a suitable member 27, and a head 28 carrying a pipe 29 for delivering water, oil or other fluid may be tightly secured to the opposite end of the tube. The helical fin 6' is placed on the tube 7' and the ends of the fin are fixed against movement circumferentially about the tube by soldering or welding at the points 30 and 31, or by other suitable means. The water, oil or other fluid is then introduced to the interior of the tube 7' under sufficient pressure to expand the tube into tight and permanent engagement with the inner edge of the fin 6'.

Whether the tube is expanded mechanically or by hydraulic pressure, the expansion is in each case of sufficient magnitude to stretch the tube metal beyond its elastic limit so that the tube is permanently set in its expanded position. The expansion of the tube is not however, of sufficient magnitude to deform the fin metal beyond its elastic limit throughout the depth of the fin and accordingly at least a portion of the fin is resiliently stressed and maintains a firm resilient grip on the tube surface after the tube expanding operation is completed. Thus, my method forms a secure and permanently resilient bond between the fin and tube.

In a modified form of my invention, either the tube surface, the inner edge surface of the fin or both of these surfaces are roughened, knurled or otherwise provided with surface irregularities or extensions before the tube is expanded against the fin. This roughening of the tube surface or fin edge surface may be accomplished in any suitable manner as by the use of a cutting die or knurling roller. Means for producing surface irregularities of this type are described in the copending application of Edward A. Dewald, Serial No. 659,894, filed March 6, 1933. Surface irregularities or knurl marks 32 are shown on the tube illustrated in Fig. 5 and it will be understood that such irregularities can be as well employed on the inner edge surface of the fin. The knurl marks on either or both of the engaging surfaces cause interengagement of the tube and fin metal as the tube expands, and so form a tight and permanent bond which holds the fin in place even if a considerable force is applied to the fin.

As stated above, it is sometimes preferred to form the metallic fin ribbon into a helical coil as it is placed on the tube instead of using a precoiled fin. The helical coiling of the fin on the tube may be accomplished by any suitable means and in Fig. 4, I have diagrammatically illustrated coiling apparatus suitable for this purpose. The apparatus includes a guide block 33 having an opening therein, through which the metallic fin forming ribbon or strip 34 may be fed in a tangential direction with respect to the tube 35. The ribbon 34 is pressed on to the tube surface by a slotted lead roll 36, carried adjacent the tube in journals substantially parallel to the tube axis. The tube 35 is rotated in the direction indicated and is simultaneously advanced axially relative to the guide block 33 and roll 36, the ribbon 34 being thereby wound in a helix about the tube. If desired, a set screw 37 or equivalent means may be provided in the guide block 33 to maintain the proper tension on the ribbon 34 during winding operation. This winding of the ribbon directly on the tube to which it is subsequently fixed may, of course, be employed either when the tube is expanded by mechanical means or hydraulic pressure. In the appended claims, the term "placing" or "positioning" a helically coiled fin about the tube surface denotes the placing of a precoiled fin on the tube or the winding of a ribbon into helical form as it is placed on the tube.

It will, of course, be understood that various forms of apparatus other than those described above may be used in carrying out my improved method. Thus, the tube may be expanded by means other than the particular tool described, such as a steel ball drawn or forced through the bore of the tube. Further, the fin retaining magazine disclosed in connection with the embodiment of my invention where the expansion is progressive may be omitted in cases where the fin is wound on the tube with sufficient force to prevent slipping of the fin longitudinally of the tube as the progressive expansion takes place.

I claim:

1. The method of securing a helical fin on a metallic tube which comprises placing a helically coiled fin about the tube surface, fixing the fin against circumferential movement about the tube due to expansion of the tube and expanding the tube into gripping contact with the fin.

2. The method of forming a permanent heat conductive bond between a helical metallic fin and a metallic tube which comprises positioning a helically coiled fin about the tube surface, fixing the fin against circumferential movement about the tube due to expansion of the tube and expanding the tube metal beyond its elastic limit to bring the tube into engagement with the fin, the expansion of the tube being of insufficient magnitude to deform at least a portion of the fin metal beyond its elastic limit.

3. The method of forming a permanent heat conductive bond between the inner edge surface of a helical fin and the exterior surface of a cylindrical metallic tube which comprises roughening at least one of said surfaces, applying a helically coiled fin about the tube and expanding the tube into gripping engagement with the fin.

4. The method of forming a permanent heat conductive bond between the inner edge surface of a helical fin and the exterior surface of a cylindrical metallic tube which comprises forming surface protrusions on at least one of said surfaces, placing the fin about the surface of the tube, fixing the fin against circumferential movement about the tube due to expansion of the tube and expanding the tube into gripping engagement with the fin.

5. The method of forming a permanent heat conductive bond between a helical fin and a cylindrical metallic tube which comprises positioning a helically coiled fin about the surface of a tube having surface irregularities thereon, fixing the fin against circumferential movement about the tube due to expansion of the tube and expanding the tube to such an extent that the tube metal is stretched beyond its elastic limit and the tube is brought into gripping engagement with the fin.

6. The method of securing a helical fin on a tube which comprises winding a metallic ribbon on a tube in the form of an edgewise helical coil, fixing the ribbon against circumferential movement about the tube due to expansion of the tube and expanding the tube into firm gripping engagement with the inner edge of the fin.

7. The method of securing a helical fin on a tube which comprises placing a helically coiled fin about the tube surface, fixing the fin against movement circumferentially about the tube due to expansion of the tube, fixing the successive turns of the fin against movement longitudinally of the tube and progressively expanding the tube into engagement with the fin.

8. The method of securing a helical fin on a tube which comprises placing a helically coiled fin about the tube surface, fixing the successive turns of the fin against movement longitudinally and circumferentially of the tube and progressively expanding the tube into engagement with the fin.

RUSSELL C. JONES.